July 29, 1930.  W. STORRIE  1,771,824
WINDSHIELD WIPER BLADE
Filed March 27, 1929
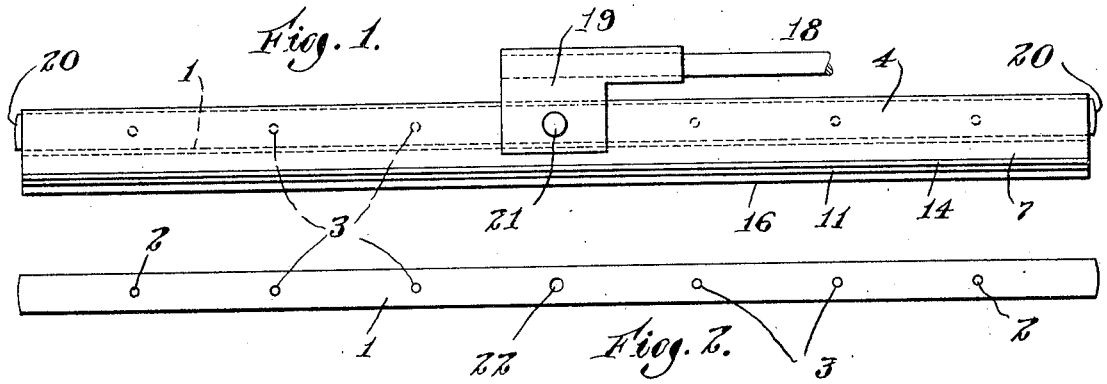
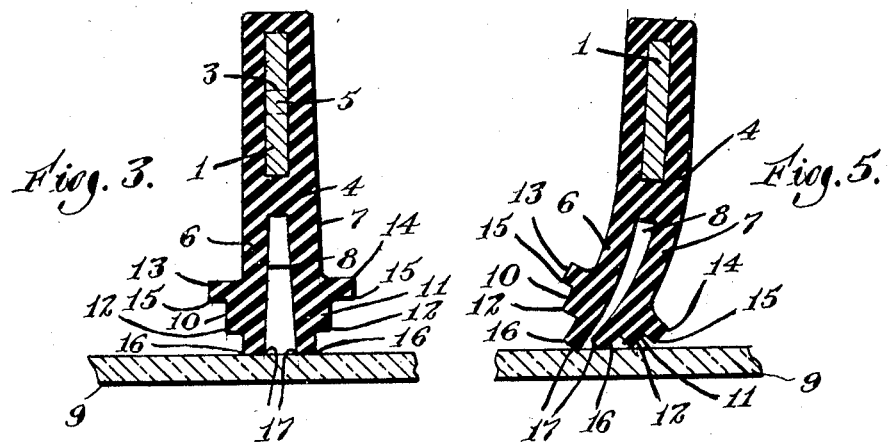
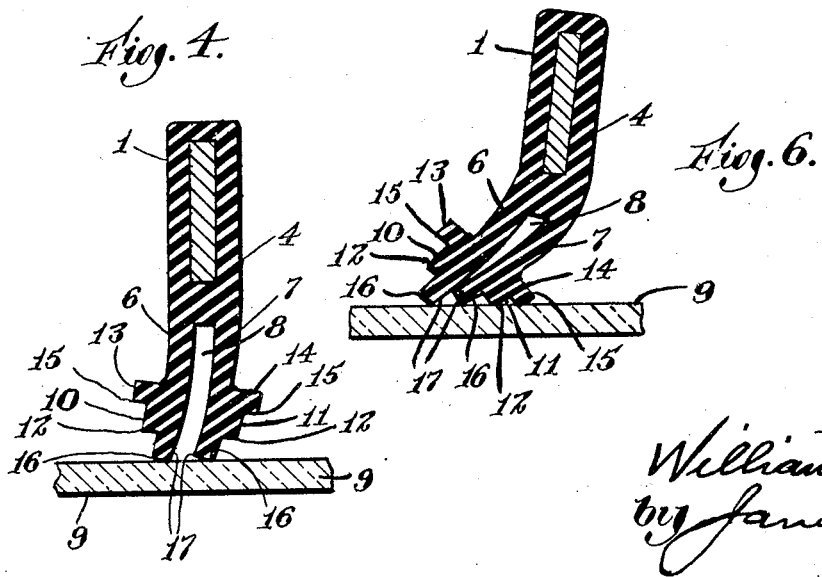
Inventor
William Storrie
by James R. Hodder
Attorney Patented July 29, 1930

1,771,824

UNITED STATES PATENT OFFICE

WILLIAM STORRIE, OF PROVIDENCE, RHODE ISLAND, ASSIGNOR TO APCO MOSSBERG CORPORATION, OF ATTLEBORO, MASSACHUSETTS, A CORPORATION OF MASSACHUSETTS

WINDSHIELD-WIPER BLADE

Application filed March 27, 1929. Serial No. 350,258.

The invention of the present application relates to wiping blades, intended for cleaning and wiping vitreous surfaces, and is particularly adapted for use as a windshield wiper blade, to clean from windshields any rain, snow, moisture or other coatings in order that the occupants of an automobile may have a clear and uninterrupted vision through said windshield.

An important object of the present invention is the provision of a wiper blade wherein substantially all exposed or exterior surfaces are of rubber or rubber composition. This is an important advantage and feature, as it eliminates scratching or marring of the windshield or other glass surface on which the blade is operating, as the only exposed metal portions are the protruding ends of the reinforcing strip which is so positioned that it cannot come in contact with the glass surface during operation of the blade.

Another and important object of the invention consists in providing a plurality of ping strips, prongs or the like, preferably integral with the main body portion of the blade, being preferably molded therewith, each of which strips is normally out of contact with its adjacent blade or prong. In the preferred form of the invention there are two of these integral depending strips and regardless of the pressure of the strips on the surface being cleaned, there will also remain a channel extending longitudinally of the wiper, through which channel moisture may flow and escape at the lower end of the blade.

Another and equally important feature of the present invention resides in providing, on the outer side of each of said depending strips, a plurality of ribs extending longitudinally of the said strips, said ribs being graduated upwardly from the outer wiping edge of the strip, and each rib having a wiping edge normally spaced equi-distant from the outer wiping edge of its respective strip.

This last described structure permits said graduated wiping edges of said ribs to function as scrapers, breaking up globules of rain which collect on the surface being cleaned, in advance of the wiping edges of the depending strips, and which will also break up snow or other congealed matter, after which the normal wiping edges of the strips will more readily and easily remove the same. These graduated ribs serve a further function of reinforcing and strengthening the normal wiping edge, and of adding rigidity thereto, and of preventing too great flexing thereof, thus enabling said normal wiping edges to exert greater pressure against the surface to be cleaned, resulting in a more efficient and more positive cleaning.

Another feature of the present invention resides in the fact that the entire blade is molded into one homogeneous device, thus resulting in a much stronger, longer lasting, and less destructible device.

In carrying out my present invention, I utilize a substantially flat strip of suitable material, such as metal, having rounded ends, provided with a plurality of apertures throughout the length thereof, through which the rubber will flow and solidify around and through said reinforcing strip, resulting in a unitary rugged structure, the ends of the said reinforcing strip protruding beyond the rubber body and enabling the said strip to be centered in a mold.

Located in the center of said metallic reinforcing strip, is an aperture by means of which the strip may also be centered in a mold, and also by means of which the completed blade may be attached to a clip carried by an arm driven from a motor or any suitable source of power.

I believe that my windshield wiping blade, as above briefly described, is novel, and have therefore claimed the same broadly in this application.

The above and other objects of the invention, details of construction, combinations and advantages, will be hereinafter more fully pointed out, described and claimed.

Referring to the drawings, illustrating a preferred embodiment of the present invention, Fig. 1 is a side elevation of the completed wiping blade ready for operation;

Fig. 2 is a side elevation of the metallic reinforcing strip;

Fig. 3 is a cross-sectional view of the blade in normal position on a surface to be cleaned;

Fig. 4 is a cross-sectional view similar to Fig. 3 illustrating the blade in its operation of being wiped across the surface to be cleaned when light moisture is encountered;

Fig. 5 is a cross-sectional view illustrating a blade having a slight rocking effect and with greater pressure applied by the strips against the surface to be cleaned, and with one of the graduated ribs also in contact with said surface; and Fig. 6 is a cross-sectional view illustrating still further pressure being applied to said blade, and with both of the graduated ribs on one depending strip in contact with the surface to be cleaned, the position of the blade illustrated in Fig. 6 being particularly adaptable for snow, sleet and other extreme conditions.

Referring now to the drawings, for a particular description of the invention, 1 designates a strip of suitable material, preferably steel or other metal, having throughout the length thereof a plurality of apertures 2 and 3, of which any desired number may be provided. The strip 1 is then surrounded, except for its extreme ends 20, with suitable rubber, or rubber composition, in such manner as to form a body portion 4, the rubber flowing through the apertures 3, as illustrated at 5, and firmly uniting the body portion around the strip 1, which is embedded and substantially entirely concealed within said body portion, the only exposed portions of said strip being the extreme ends 20, which will aid in centering the said strip in the mold. Depending from the body portion 4, and integral therewith, are a pair of strips 6 and 7 of the same height. In normal position, as illustrated in Fig. 3, these strips are spaced apart and out of engagement with one another, with a channel 8 therebetween. Regardless of the pressure which is exerted on these strips 6 and 7 during operation, the channel 8 will always remain open longitudinally of the blade, thus affording a clear passage throughout the length of the blade for moisture or rain to travel, thus reducing the amount of moisture which the blade must remove or clean from the surface being cleaned, here illustrated as a glass surface 9.

Formed integral with each strip 6 and 7, on the outside thereof, at a predetermined distance above the bottoms thereof, and extending substantially the full length thereof, are ribs 10 and 11, each of said ribs having a wiping corner or edge 12 thereon.

Also formed integral with each strip 6 and 7, on the outside thereof, at a predetermined distance above the ribs 10 and 11, and extending longitudinally substantially the entire length thereof, are ribs 13 and 14, each of said ribs having a wiping corner or edge 15 thereon. The ribs 13 and 14 extend outwardly from the sides of the strips 6 and 7 a greater distance than the ribs 10 and 11, thus giving a graduated construction to the blade. The wiping edges 12 and 15 are preferably equidistant above the wiping edges 16 of the strips 6 and 7. Each strip 6 and 7 also has an inner wiping corner or edge 17, the edges 16 and 17 being alternately effective on operation of the blade.

The graduated ribs 10, 11, 13 and 14 perform very useful functions during the operation of my novel blade, in that they reinforce the strips 6 and 7, and cause the same to exert greater pressure on the surface 9 than would otherwise be possible.

With only light rains or moisture conditions being encountered, but slight pressure on the surface to be cleaned, is requisite, this pressure being determined by the position of the rod 18 carrying a clip 19 to which the blade is attached by means of a bolt or screw 21, the reinforcing strip 1 being provided with a central aperture 22 to permit passage of the bolt or screw 21 therethrough. The blade may have a rocking motion in the clip 19, which will be found desirable under certain conditions.

When but slight pressure is applied to the blade, during oscillation of the same back and forth on the surface 9, such as a windshield, only the outer edge 16 of one blade and the inner edge 17 of the opposite strip will contact with said surface, as clearly illustrated in Fig. 4. This pressure and contact will be amply sufficient to remove light deposits of rain, for example, and due to the rigidity afforded by the graduated ribs, will effect a thorough cleaning action on said surface.

Should heavier weather conditions be encountered, however, the pressure on the blade may be increased, and a slight rocking imparted to the body 4, whereupon the said edges 16 and 17, as well as the edge 12 of one of the ribs 10 or 11 will contact with the windshield, the edge 15 of the corresponding rib 13 or 14 being spaced slightly above the surface 9 to effect a preliminary cleaning of said surface, and in the case of snow this edge 15 will impart a preliminary cleaning or scraping action which is extremely efficient and satisfactory.

If desired, still further pressure may be applied to the blade, whereupon the edges 16 and 17 above referred to, the edge 12 and the edge 15 will also be in contact with the surface 9 simultaneously, thus giving four separate and distinct cleaning or scraping edges functioning at the same time. The advantages of this plurality of wiping edges, as well as the reinforcement provided by the graduated ribs, will be instantly apparent to those skilled in this art.

While I have necessarily described my present invention somewhat in detail, it will be understood that I may vary the size, shape and arrangement of parts within reasonably wide limits without departing from the spirit of the invention.

It will also be understood that increasing the speed of the travel of the blade across the surface being cleaned will effect a friction which will impart a rocking motion to the blade and will also increase the pressure of the blade upon said surface.

My invention is further described and defined in the form of claims as follows:

1. A wiper blade comprising a body portion, a plurality of integral depending strips thereon, each of said strips having a plurality of graduated ribs extending longitudinally of its outer side, each of said strips having a plurality of terminal wiping edges, and each of said graduated ribs having a wiping edge spaced at equi-distant intervals from the terminal wiping edge of its respective strip.

2. A wiper blade comprising a body portion, a plurality of integral depending strips thereon, said strips being normally spaced from each other at one edge to provide a narrow channel therebetween, and each of said strips having a plurality of graduated wiping ribs extending longitudinally of its outer side.

3. A wiper blade comprising a body portion, a plurality of integral depending strips thereon and substantially flush therewith, said strips being normally spaced from each other throughout their entire extent, each of said strips having a plurality of graduated ribs extending longitudinally of its outer side, and each of said ribs having a wiping edge, whereby, on predetermined pressure being applied to said blade, any desired number of cleaning edges may be simultaneously engaged with the surface to be cleaned.

4. A wiper blade comprising a body portion, a plurality of integral depending strips thereon, said strips being normally spaced from each other at one edge, each of said strips having a plurality of graduated ribs extending longitudinally of its outer side, and each of said ribs having a wiping edge, whereby, on predetermined pressure being applied to said blade, any desired number of cleaning edges may be alternately simultaneously engaged with the surface to be cleaned.

In testimony whereof, I have signed my name to this specification.

WILLIAM STORRIE.